United States Patent
Guidetti

(10) Patent No.: US 6,360,872 B1
(45) Date of Patent: Mar. 26, 2002

(54) DEVICE FOR STACKING ARTICLES ADVANCING ON A CONVEYOR LINE

(75) Inventor: Dario Guidetti, Grignasco (IT)

(73) Assignee: Cavanna S.p.A. (IT)

( * ) Notice: Subject to any disclaimer, the term of this patent is extended or adjusted under 35 U.S.C. 154(b) by 0 days.

(21) Appl. No.: 09/521,732

(22) Filed: Mar. 8, 2000

(30) Foreign Application Priority Data

Apr. 23, 1999 (EP) .............................................. 99830241

(51) Int. Cl.⁷ ................................................. B65G 57/11
(52) U.S. Cl. .................. 198/419.1; 198/431; 414/790.7
(58) Field of Search .......................... 198/418.5, 418.6, 198/419.1, 431; 414/790.3, 790.7, 794.7

(56) References Cited

U.S. PATENT DOCUMENTS

| 3,915,316 | A | | 10/1975 | Pomara, Jr. | |
| 4,235,329 | A | | 11/1980 | Crawford et al. | 198/418.4 |
| 5,006,040 | A | * | 4/1991 | Frez | 414/790.7 X |
| 5,746,568 | A | * | 5/1998 | Ogawa et al. | 414/794.7 X |
| 5,763,861 | A | | 6/1998 | Herrera et al. | 198/431 X |
| 5,779,432 | A | * | 7/1998 | Pena | 198/418.6 X |

* cited by examiner

Primary Examiner—Janice L. Krizek
(74) Attorney, Agent, or Firm—TraskBritt

(57) ABSTRACT

The articles advance along a conveyor line in which there is drop in level of a height correlated with the height of the stacks of articles to be formed. Downstream of the drop in level a stopper member is provided which can selectively interrupt the advancing movement of the articles along the conveyor line. For each stack of articles formed, the stopper member prevents the advancing movement of at least a first article downstream of the drop in level so as to allow at least a second article to fall and to be stacked on the first article. Upon completion of the stack, the stacked articles are allowed to advance along the conveyor line again.

14 Claims, 2 Drawing Sheets

Figure 5:
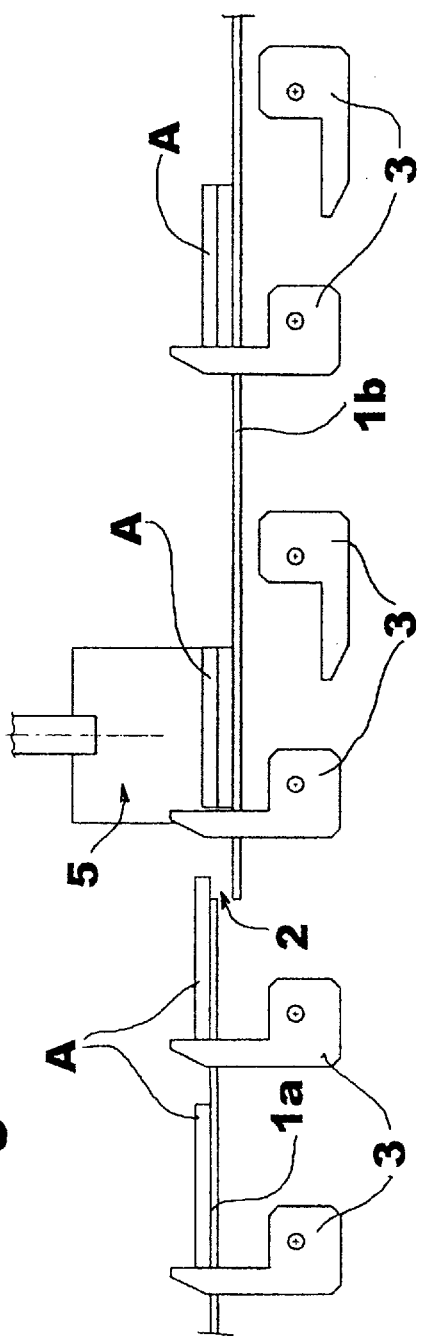

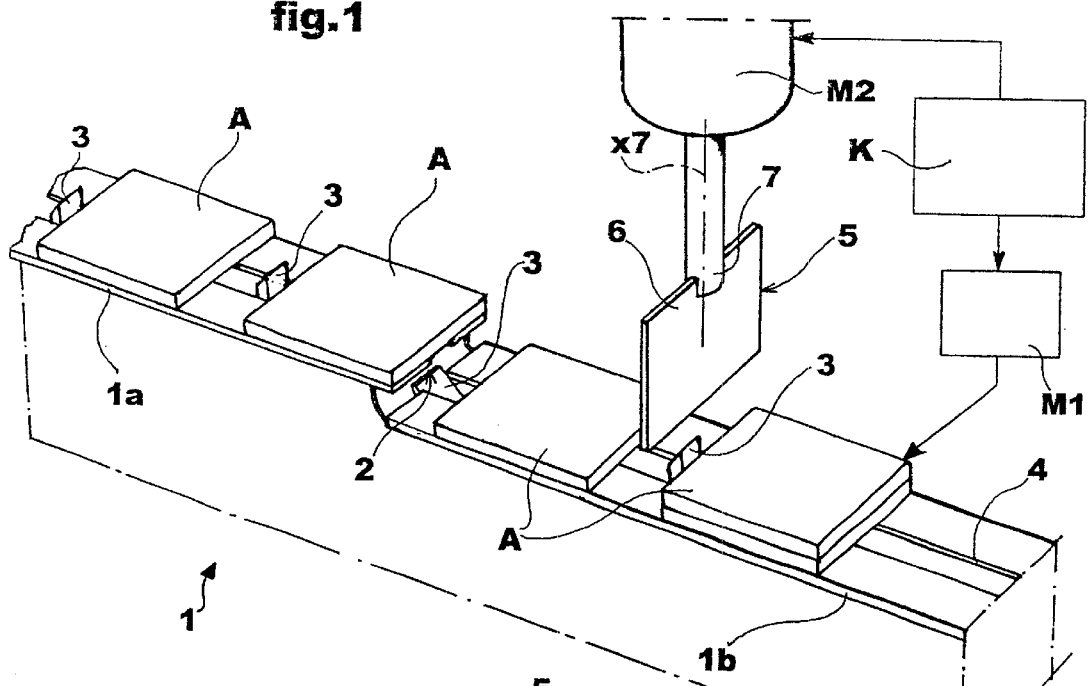
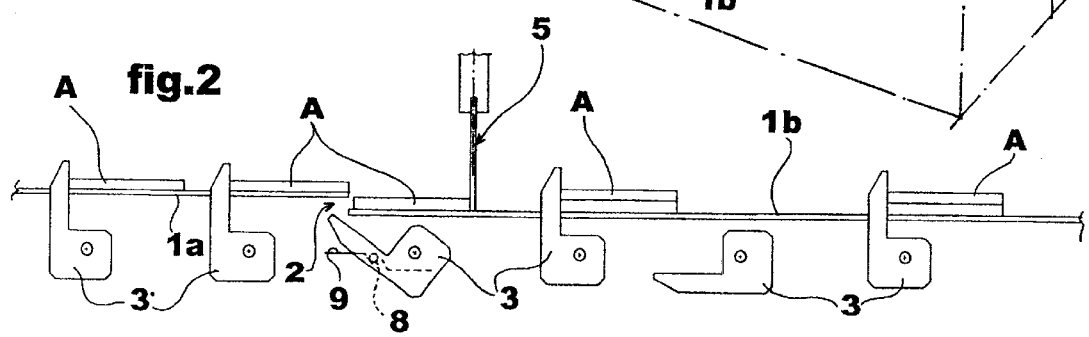
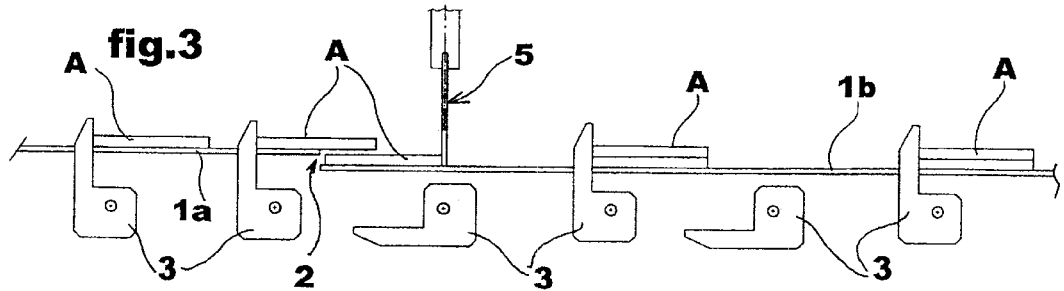
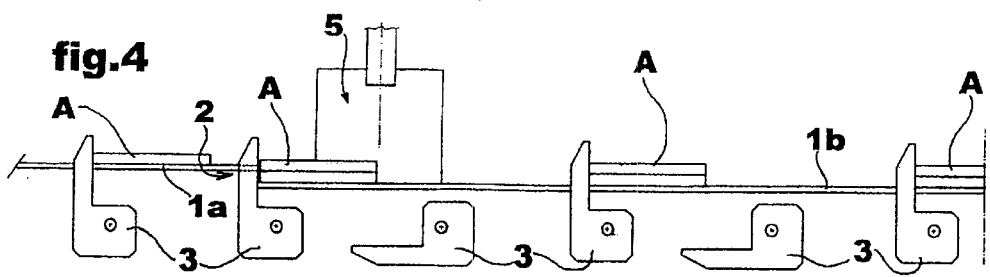

DEVICE FOR STACKING ARTICLES ADVANCING ON A CONVEYOR LINE

The present invention addresses in general the problem of stacking articles advancing on a conveyor line and has been developed with particular attention to its possible use for the stacking of articles constituted by food products, for example, confectionery products such as biscuits, chocolate bars, etc.

This problem has been addressed in various ways, both with reference to substantially "static" stacking (in which the moving articles are collected in a stack but their advancing movement is stopped; see, for example, the solution of U.S. Pat. No. 4,755,093) and with reference to a dynamic situation (in which the articles are stacked but their advancing condition is substantially maintained; see, again by way of example, the solution described in U.S. Pat. No. 5,341,913).

The present invention fits substantially into this second category and has the object basically of providing a solution which is structurally simpler than that described in U.S. Pat. No. 5,341,913, without detracting from the efficiency, speed and safety of operation of the device.

According to the present invention, this object is achieved by means of a method and a device having the specific characteristics recited in the following claims.

The invention will now be described, purely by way of non-limiting example, with reference to the appended drawings, in which:

FIG. 1 is a general perspective view of a device operating in accordance with the invention, and FIGS. 2 to 6 show various stages of operation of a device according to the invention, in an imaginary time sequence.

In the embodiment shown, it is assumed that the stacked articles A are constituted by articles of flattened shape such as rectangular or square biscuits or chocolate bars. It will be appreciated, however, that the field of application of the invention is not limited to articles of this type, since the solution according to the invention is applicable, in general, to articles which can be superimposed in the direction of advance (it is pointed out, once more, that the invention is intended to perform a "dynamic" stacking of articles advancing along a conveyor line) as a result of a vertical offset, with the ability substantially to maintain the condition of stacking. In particular, although the description given below relates to a stacking operation which provides for the superimposition of the articles A in pairs (in other words, to the formation of stacks comprising two articles A), the solution according to the invention can easily also be applied to the stacking of a different number of articles (for example, to the formation of stacks comprising three or more articles). From this point of view, an increase in the number of articles which form each stack is translated basically into a spacing out of the flow of stacks output from the continuous or substantially continuous flow of articles A input. If this spacing out is considered an adverse phenomenon (for example, because the articles arranged in stacks are to be supplied to a packaging machine of the type currently known as a "flow-pack" machine), an operation to gather the flow of stacks of superimposed articles together again may be performed downstream of the station in which the solution according to the invention is implemented. This result can be achieved with the use, for example, of the similar solution described in U.S. Pat. No. 5,341,913; since this is a solution which is known per se and in any case is (at most) subsidiary to the solution according to the invention, this function of gathering together the flow of stacks will not be described in detail herein.

The solution according to the invention provides for the formation, on a line 1 along which the articles A advance in a given direction (from left to right with reference to the viewpoint of the drawings), of a drop in level, generally indicated 2.

The nature and the characteristics of the line 1 are not critical per se for the purposes of the implementation of the invention. The embodiment described herein provides for the line 1 to be constituted, substantially, by a track (for example, made of metal) on which the articles A slide because they are dragged along by dragging elements constituted, for example, by so-called nibs 3 which advance along the line of advance and in the direction advance of the articles A, under the action of a drive structure (for example, a motor-driven chain not visible in the drawings, driven by a motor M1), so as to advance longitudinally in a longitudinal slot 4 provided in the sliding plate of the conveyor structure 1. Conveyors of this type are widely known in the art and are currently used, for example, in the packaging of food products. A detailed description thereof is therefore unnecessary herein.

The drop in level 2 may be created simply by the provision of two successive portions of the line 1, indicated 1a and 1b, respectively, disposed in the region of the drop in level 2, the former in an upper position and projecting relative to the latter. The articles A dragged along by the elements 3 on the upstream portion 1a can thus fall at least slightly onto the downstream portion 1b in the region of the drop in level 2 (directly or by falling onto other articles A which are already disposed thereon—in accordance with the criteria described further below). Meanwhile, an arrangement which enables the articles A to be dragged along by the elements 3 is maintained during the falling and/or is in any case readopted upon completion of the falling.

In other words, the drop in level 2 should have a height correlated with the height of the stacks of articles to be formed. In general this result can easily be achieved by adjustment of the height of the drop in level so that even the last article of each stack (that which is to occupy the top position) is actually able to fall onto the top of the under-lying article or articles. In detail, adjustment means (not shown and of known type) may advantageously be associated with one or both line portions 1a, 1b to permit fine adjustment of the drop in level 2 in dependence on the specific requirements of use (the characteristics of the articles A, the speed of advance, the number of articles in the stacks, etc . . . ).

The operation of the motor M1 which brings about the advance of the articles A on the line 1 is controlled, in known manner, by a control unit K which supervises, in general, the operation of the plant of which the elements shown in FIG. 1 form part. The unit K may advantageously be constituted by a processor device of the type currently known as a Programmable Logic Controller or PLC.

The same unit K controls, by means of a further motor M2, the operation of a barrier 5 located adjacent the drop in level 2 and, more precisely, downstream thereof, in the direction of advance and of falling of the articles A. The barrier 5 can thus stop the advancing movement of the articles A selectively on the downstream portion 1b of the line 1.

In an embodiment which has been found particularly advantageous, the barrier 5 is constituted simply by a plate 6 which can be extended vertically across the line 1 for a certain width thereof (approximately half of the line) closely adjacent the sliding surface of the line 1 so as to be able to stop the advancing movement of the articles A (temporarily, as will be explained below).

On account of the fast rates of advance of the articles A (typically several hundred of articles A per minute) and of the correspondingly fast speed of operation of the barrier 5, in a particularly advantageous embodiment, the plate 6 is mounted in a central position beneath the shaft 7 of the motor M2 which is rotated about a vertical axis extending in a lateral position relative to the line 1.

By rotating the motor 4 in steps each corresponding to a rotation of the shaft 7 though 90° about its vertical axis X7, it is possible to achieve, in rapid sequence and without this leading to adverse operating conditions of the members involved, a sequence of stages of operation in which:

the plate 6 extends across the line 1, opposing the advancing movement of the articles A on the line 1, the plate 6, which has been rotated through 90°, is oriented parallel to the line 1 on one side thereof and hence is in a condition of disengagement from the flow of articles, which can thus advance freely, the plate 6, which has rotated through a further 90°, extends across the line 1 again, stopping the flow of articles A, the plate 6, which has rotated through 90° once more, is arranged in alignment with and beside the line 1 again, releasing the articles A which are free to advance, etc . . .

Naturally, although this embodiment of the invention is currently preferred, it is not essential; other embodiments of the barrier 5, for example, with stop elements which are lowered and raised alternately relative to the plane of advance of the articles on the line 1, may in fact be considered.

On the basis of a solution which is also known per se (and hence does not require detailed description herein) there is also provision for the dragging elements or nibs 3 (or at least some of them) to be formed in a manner such as to be orientable/translatable selectively between:

a first operating position (corresponding to a substantially vertical orientation, with reference to the appended drawings), in which the nibs 3 project upwards through the longitudinal slot 4 of the line 1 and drag the articles A along (individual or stacked articles, as will be explained further below), and a second operating position in which, as a result of being turned over backwards to a substantially horizontal position (as in the embodiment to which the drawings relate) or as a result of a general lowering movement, the nibs 3 are retracted beneath the sliding surface of the line 1 (and hence also the plane of movement of the portion 1*b* disposed in the lower position at the drop in level 2) so that they no longer drag the articles A along.

Experts in the art will know of various applicable solutions which enable this result to be achieved. The appended drawings (principally only FIG. 2) in fact refer, purely by way of example, to the possible presence, on the nibs 3, of cam-follower elements 8 which cooperate with a cam 9 extending substantially along with the line 1, achieving the desired effect of the disappearance of the nibs 3 beneath the line 1 in the region of the drop in level 2.

In particular, it will be appreciated from a comparative examination of FIGS. 2 to 5, that not all of the nibs 3 are involved in the above-mentioned disappearance movement. In the embodiment described herein, which relates to the formation of stacks comprising two superimposed articles A, there is provision for the nibs 3 to disappear in individual alternating sequence, that is, one nib disappears and one nib does not. For the formation of stacks with a different number of superimposed articles (for example, three superimposed articles), the disappearance beneath the line 1 involves pairs of successive nibs 3 alternating with individual nibs 3 which remain in the vertical position necessary to drag the articles A along. To produce stacks comprising four superimposed articles, the disappearance involves groups of three successive nibs 3 alternating with individual nibs 3 which remain in the vertical dragging position.

The reasons for this law of operation will become clear from the description of the sequence of FIGS. 2 to 6 given below. In particular, experts in the art will appreciate that the disappearance movement (particularly with regard to the definition of the above-mentioned sequences of alternation) may be brought about either by mechanical means—for example by a system of cams and cam followers—or by the association, with the individual nibs 3, of orientation means such as, for example, motor-driven deflector means which operate on the nibs 3 selectively, orienting them alternatively between the vertical dragging position and the disappearance position beneath the conveyor line, the deflector means having respective associated actuators, for example, electric actuators. In this case, the sequence of orientation of the nibs may be controlled by the unit K as a result of suitable programming (also performed in accordance with criteria known per se to experts in the art).

The operating sequence to which FIGS. 2 to 6 relate can easily be understood if it is borne in mind that the articles A advance on the input pass 1*a* of the line 1, being dragged along by respective nibs 3 so as to fall towards the plane of advance of the second portion 1*b* of the line 1 in the region of the drop in level 2.

With reference to the formation of stacks comprising two superimposed articles, at the moment when each article A falls in the region of the drop in level 2, the article A may be faced with two different situations.

Figure 6:
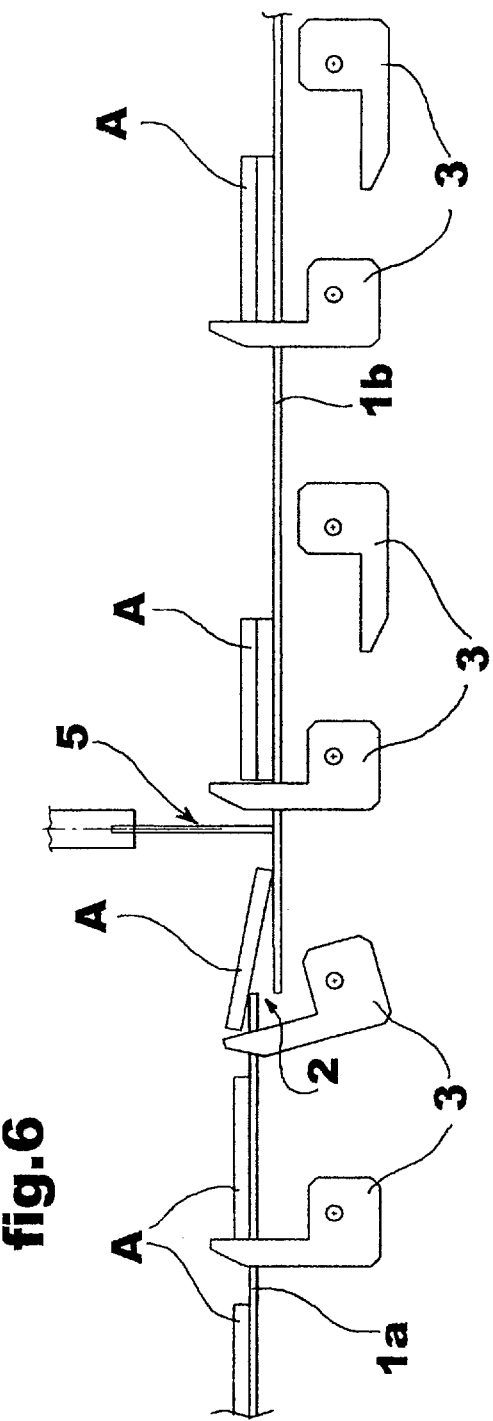

In particular, the flow of articles A arriving on the upstream portion 1*a* of the line 1 may be considered to be divided into a sequence of consecutive pairs:

the first article of each pair falls onto the downstream portion 1*b* and is prevented from advancing further along the line 1 by the barrier 5; meanwhile, the respective dragging nib 3 disappears beneath the line 1, preventing the article A in question from being forced against the barrier 5 which would clearly result in destruction of the article; this is the situation, for example, of the article in the further-upstream position on the portion 1*b* shown in FIGS. 2 and 6 of the appended drawings;

the other article of each of the above-mentioned pairs drops towards the downstream portion 1*b* of the line 1 and is superimposed on the first article of the same pair which is already on the portion 1*b;* the second article of the pair, which is still dragged along by the respective dragging nib 3—which does not disappear beneath the line 1—is superimposed on the first article, at the same time being stacked as a result of a sliding movement notionally intended to be stopped by the barrier 5; the wording notionally is used since, as the upper article A of each stack falls onto the underlying article, the barrier 5 rotates to the open position so as to allow the stack of two articles A thus formed to advance further along the portion 1*b* of the line under the action of the nib 3 which has continued to drag forwards the article A which now occupies the upper position in the stack.

The movement of i) falling on top of one another, ii) sliding towards the stacking position, and iii) subsequent advance of the stack of two articles A thus formed, can clearly be inferred from the sequence of FIGS. 3 to 5 of the appended drawings; given the intrinsically cyclic structure of the flow, the operating condition immediately following that shown in FIG. 6 (with a first article of a new pair falling down to be stopped by the barrier 5 whilst the respective nib 3 is oriented downwardly, disappearing beneath the line 1), immediately precedes the situation shown in FIG. 2.

It is also clear that the solution described with reference to the formation of stacks of two articles can easily be extended to the formation of stacks comprising, for example three superimposed articles A.

In this case, the articles A input to the device from the portion 1a can be seen as being theoretically in sets of three articles A, each set of three being intended to form a stack of three superimposed articles.

With regard to the first article of each set of three, the behaviour of the device described is exactly the same as that described above with reference to the formation of stacks of two superimposed articles.

The second article of each set of three, however, is dragged along by the respective nib 3 until it falls onto the first article which is already on the portion 1b, stopped by the barrier 5 and no longer dragged along by the respective nib 3. The second article of every three is also pushed against the barrier 5 by the respective dragging nib 3 which, however, also disappears beneath the line 1, as has already happened for the dragging nib 3 of the first article (hence the above-mentioned sequence of disappearance of two nibs in three).

The third article A of each set of three, however, is manipulated in exactly the same way as the second article of the above-described pairs. The third article in question, which is to constitute the top article of the stack, is pushed forwards by the respective nib 3 through the drop in level 2 so as to fall onto the two articles A already stacked on the portion 1b and held in precise relative position by the barrier 5. In this case, as in the case of the top article of the stacks of two articles, the dragging nib 3 of the article A in the top position does not disappear beneath the line 1 but continues to drag along, in addition to the top article A, also the two articles disposed beneath it in the stack. The respective dragging movement is permitted by the release of the barrier 5 which rotates so as to permit free advance of the stack of three articles thus formed on the downstream portion 1b of the line 1.

The extension of the concept described above to the formation of stacks of four or more articles is clear and does not therefore need to be described in greater detail herein.

Moreover, it is clear from the foregoing that the same device can easily be adapted to the processing of different articles and/or to the formation of stacks containing different numbers of articles:
- by adapting the height of the drop in level 2 to the height of the articles and/or of the stacks to be formed and/or
- by modifying the sequence of "disappearance" of the nibs 3 and of operation of the barrier 5.

Naturally, the principle of the invention remaining the same, the details of construction and forms of embodiment may be varied widely with respect to those described and illustrated, without thereby departing from the scope of the present invention as defined by the appended claims.

What is claimed is:

1. A device for stacking articles advancing along a conveyor line, comprising:
   in the conveyor line, a drop in level of a height correlated with the height of the stacks of articles to be formed,
   a stopper member disposed downstream of the drop in level for selectively preventing the advancing movement of the articles along the conveyor line, the stopper member comprising at least one plate element which can extend selectively across the conveyor line to prevent the advancing movement of the articles and
   a controller adapted for selectively acting on the stopper member to prevent, for each stack of articles, the advancing movement of at least a first article downstream of the drop in level so as to allow at least a second article to fall and to be stacked on the first article, and in order to allow the stacked articles to advance along the conveyor line again upon completion of the stack;
   wherein the plate element is mounted for rotating selectively about an axis disposed laterally relative to the conveyor line, the rotation about the axis causing the plate alternatively to extend across the conveyor line to prevent the advancing movement of the articles and to be arranged in alignment with and beside the conveyor line, allowing the articles to advance freely on the conveyor line.

2. The device according to claim 1 comprising dragging members for advancing the articles along the conveyor line by means of a positive dragging action, and wherein a preventing arrangement is provided which, starting from the drop in level, prevents the positive dragging action on the articles, the advancing movement of the articles being prevented by the stopper member.

3. The device according to claim 2, wherein the dragging members are configured to engage said articles, said dragging member comprising nib elements in association with an operating arrangement which can selectively bring about a disengagement of the nib elements from the respective articles.

4. The device according to claim 2, wherein the dragging members, adapted to act on the article occupying the top position of each stack, are not subjected to the action of the preventing arrangement so that the positive dragging action brings about the advance of the top article, and the advance of the respective stack, upstream and downstream of the drop in level, respectively.

5. The device according to claim 2, wherein the dragging members comprise nib elements which engage the articles and which project from a respective plane of movement of the articles, the preventing arrangement being configured to selectively bring about orientation of the nib elements towards a position in which the nib elements are lowered relative to the plane of movement and are disengaged from the articles.

6. A device for stacking articles advancing along a conveyor line, comprising:
   in the conveyor line, a drop in level of a height correlated with the height of stacks of articles to be formed,
   a stopper member disposed downstream of the drop in level for selectively preventing an advancing movement of the articles along the conveyor line,
   a controller adapted for selectively acting on the stopper member to prevent, for each stack of articles, the advancing movement of at least a first article downstream of the drop in level so as to allow at least a second article to fall and to be stacked on the first article, and in order to allow the stacked articles to advance along the conveyor line again upon completion of the stack; and
   dragging members for advancing the articles along the conveyor line by means of a positive dragging action, wherein a preventing arrangement is provided which, starting from the drop in level, prevents the positive dragging action on the articles, the advancing movement of the articles being prevented by the stopper member; and wherein the dragging members comprise nib elements for engaging said articles and wherein an operating arrangement is provided which is configured for selectively disengaging the nib elements from said articles.

7. The device according to claim 6, wherein the dragging members comprise nib elements which engage the articles and which project from a respective plane of movement of the articles, the preventing arrangement being configured to selectively bring about orientation of the nib elements towards a position in which the nib elements are lowered relative to the plane of movement and are disengaged from the articles.

8. The device according to claim 6, wherein the dragging members, adapted to act on the article occupying the top position of each stack, are not subjected to the action of the preventing arrangement so that the positive dragging action brings about the advance of the top article, and the advance of the respective stack, upstream and downstream of the drop in level, respectively.

9. The device according to claim 6, wherein the stopper member comprises at least one plate element which can extend selectively across the conveyor line to prevent the advancing movement of the articles.

10. The device according to claim 9 wherein the plate element is mounted for rotating selectively about an axis disposed laterally relative to the conveyor line, the rotation about the axis causing the plate element alternatively to extend across the conveyor line to prevent the advancing movement of the articles and to be arranged in alignment with and beside the conveyor line, allowing the articles to advance freely on the conveyor line.

11. A device for stacking articles advancing along a conveyor line, comprising:

in the conveyor line, a drop in level of a height correlated with the height of stacks of articles to be formed, a stopper member disposed downstream of the drop in level for selectively preventing an advancing movement of the articles along the conveyor line, a controller adapted for selectively acting on the stopper member to prevent, for each stack of articles, the advancing movement of at least a first article downstream of the drop in level so as to allow at least a second article to fall and to be stacked on the first article, and in order to allow the stacked articles to advance along the conveyor line again upon completion of the stack; and dragging members for advancing the articles along the conveyor line by means of a positive dragging action, wherein a preventing arrangement is provided which, starting from the drop in level, prevents the positive dragging action on the articles, the advancing movement of the articles being prevented by the stopper member; and wherein the dragging members comprise nib elements which engage the articles and which project from a respective plane of movement of the articles, the preventing arrangement being configured to selectively bring about orientation of the nib elements towards a position in which the nib elements are lowered relative to the plane of movement and are disengaged from the articles.

12. The device according to claim 11, wherein the dragging members, adapted to act on the article occupying the top position of each stack, are not subjected to the action of the preventing arrangement so that the positive dragging action brings about the advance of the top article, and the advance of the respective stack, upstream and downstream of the drop in level, respectively.

13. The device according to claim 11, wherein the stopper member comprises at least one plate element which can extend selectively across the conveyor line to prevent the advancing movement of the articles.

14. The device according to claim 11, further comprising an operating arrangement configured for selectively disengaging the nib elements from said articles.

\* \* \* \* \*